(12) United States Patent
Pugh et al.

(10) Patent No.: US 6,443,000 B1
(45) Date of Patent: Sep. 3, 2002

(54) MEASURING STICK AND THERMOMETER

(76) Inventors: Dana E. Pugh, R.R. #2 Harstone Road, Kakabeka Falls, Ontario (CA), P0T 1W0; Kendall James Miles, 168 Conestoga Street, Thunder Bay, Ontario (CA), P7C 5T1

( * ) Notice: Subject to any disclaimer, the term of this patent is extended or adjusted under 35 U.S.C. 154(b) by 0 days.

(21) Appl. No.: 09/721,996

(22) Filed: Nov. 27, 2000

Related U.S. Application Data
(60) Provisional application No. 60/211,979, filed on Jun. 16, 2000.

(51) Int. Cl.[7] .......................... G01F 23/04; G01F 25/00; G01K 1/14; G01K 13/00
(52) U.S. Cl. .......................... 73/149; 73/290 B; 73/292; 33/702; 33/722; 374/142; 374/54
(58) Field of Search .................. 374/142, 141, 374/146, 54, 4; 73/292, 290 R, 291, 290 B, 861.01, 149; 33/722, 730, 1 V, 702

(56) References Cited

U.S. PATENT DOCUMENTS

| | | | |
|---|---|---|---|
| 540,272 A | * 6/1895 | Rogers | 374/142 |
| 1,378,280 A | * 5/1921 | Rogers | 33/722 |
| 1,848,952 A | * 3/1932 | Hurley | 374/142 |
| 1,947,592 A | * 2/1934 | Haller | 374/142 |
| 3,241,368 A | * 3/1966 | Newitt | 73/290 B |
| 3,448,589 A | * 6/1969 | Marshall et al. | 62/125 |
| 4,154,105 A | * 5/1979 | Mackley | 374/142 |
| 4,523,460 A | * 6/1985 | Strickler et al. | 73/292 |
| 4,618,268 A | * 10/1986 | Horner | 73/292 |
| 4,805,453 A | * 2/1989 | Haynes | 73/292 |
| 4,819,484 A | * 4/1989 | White | 116/228 |
| 4,969,749 A | * 11/1990 | Hasselmann | 374/4 |
| 5,282,386 A | * 2/1994 | Niemczyk et al. | 374/142 |
| 6,223,596 B1 | * 5/2001 | Wilkins | 73/290 R |

FOREIGN PATENT DOCUMENTS

| | | | | |
|---|---|---|---|---|
| DE | 28 22 593 B1 | * | 10/1979 | 374/142 |
| JP | 55-40937 | * | 3/1955 | 374/142 |
| JP | 61-161424 | * | 7/1961 | 374/142 |

OTHER PUBLICATIONS

"A Dip–Stick Probe", Elektor, vol. 6, No. 4, Apr., 1980, pp. 16–17.*

* cited by examiner

*Primary Examiner*—Diego Gutierrez
*Assistant Examiner*—Stanley J. Pruchnic, Jr.
(74) *Attorney, Agent, or Firm*—Adrian D. Battison; Michael R. Williams

(57) ABSTRACT

A measuring device for calculating the depth of a liquid in a container comprises a dipstick, a plurality of indicia on the dipstick and a thermometer on the elongate member which measures the temperature of the liquid in the container such that the temperature and depth of the liquid is measured. A method of measuring liquid providing an elongate member inserted within a container of liquid such that the elongate member engages a bottom surface of the container. Providing a temperature sensor on the elongate member such that the temperature sensor is submerged in the liquid and reading the temperature of the liquid on a display which displays the temperature sensed by the temperature sensor. Removing the elongate member from the container, locating an imprint from the liquid and reading the level of liquid in the container on a plurality of indicia on the elongate member.

6 Claims, 3 Drawing Sheets

AUTOMATIC TEMPERATURE COMPENSATION CONVERSION CHART
FACTORS FOR CONVERTING PRODUCT INVENTORY TO 15 DEGREES C

| Product Temperature (°C) | Factor For Gasoline | Factor For Diesel | Product Temperature (°C) | Factor For Gasoline | Factor For Diesel |
|---|---|---|---|---|---|
| -15 | 1.0371 | 1.0251 | 8  | 1.0087 | 1.0059 |
| -14 | 1.0359 | 1.0243 | 9  | 1.0075 | 1.0051 |
| -13 | 1.0346 | 1.0233 | 10 | 1.0062 | 1.0042 |
| -12 | 1.0334 | 1.0226 | 11 | 1.0050 | 1.0034 |
| -11 | 1.0322 | 1.0218 | 12 | 1.0037 | 1.0025 |
| -10 | 1.0310 | 1.0210 | 13 | 1.0025 | 1.0017 |
| -9  | 1.0297 | 1.0201 | 14 | 1.0013 | 1.0008 |
| -8  | 1.0285 | 1.0193 | 15 | 1.0000 | 1.0000 |
| -7  | 1.0273 | 1.0185 | 16 | 0.9987 | 0.9992 |
| -6  | 1.0261 | 1.0176 | 17 | 0.9975 | 0.9985 |
| -5  | 1.0248 | 1.0168 | 18 | 0.9962 | 0.9975 |
| -4  | 1.0236 | 1.0160 | 19 | 0.9950 | 0.9966 |
| -3  | 1.0224 | 1.0151 | 20 | 0.9937 | 0.9958 |
| -2  | 1.0211 | 1.0143 | 21 | 0.9925 | 0.9949 |
| -1  | 1.0199 | 1.0134 | 22 | 0.9912 | 0.9941 |
| 0   | 1.0187 | 1.0126 | 23 | 0.9900 | 0.9932 |
| 1   | 1.0174 | 1.0118 | 24 | 0.9887 | 0.9924 |
| 2   | 1.0162 | 1.0109 | 25 | 0.9874 | 0.9915 |
| 3   | 1.0149 | 1.0101 | 26 | 0.9862 | 0.9907 |

FIG. 3

MEASURING STICK AND THERMOMETER

This application claims benefit of Provisional application Ser. No. 60/211,979 filed Jun. 16, 2000.

FIELD OF THE INVENTION

The present invention relates to a measuring stick for measuring a level of liquid in a large container or the like as well as measuring the temperature of the liquid simultaneously.

BACKGROUND

Currently, measuring the depth of a liquid in a large container is obtained by inserting a long dipstick into the container such that an imprint or the like of the liquid is left on the dipstick, This current device and method is provided for measuring the depth of the liquid but does not provide a user with a completely accurate measurement. Temperature affects liquids such that if the liquid is warm or is in a warm environment or surroundings the liquid tends to expand thereby affecting,an accurate reading of the amount. In order to obtain an accurate reading of the amount of the liquid, the temperature can be taken at the same time as the depth is recorded such that the depth can be related to and compensated for the temperature of the liquid.

SUMMARY

According to the present invention there is provided a method of measuring liquid providing;

inserting an elongate member within a container of liquid such that the elongate member engages a bottom surface of the container;

providing a temperature sensor on the elongate member such that the temperature sensor is submerged by the liquid;

reading the temperature of the liquid on a display which displays the temperature sensed by the temperature sensor;

removing the elongate member from the container;

locating an imprint from the liquid; and, reading the level of liquid in the container on a plurality of indicia on the elongate member.

Preferably providing the temperature sensor is located at a bottom end of the elongate member.

Preferably providing a temperature display is located at a top end. of the elongate member.

An advantage of the present invention is that the temperature of a liquid within a container is measured at the same time as the level of the liquid is measured allowing the operator to quickly and easily obtain a temperature compensated value.

Conveniently a guard is located at the thermometer such that display is protected from damage.

BRIEF DESCRIPTION OF THE DRAWINGS

In the accompanying drawings, which illustrate an exemplary embodiment of the present invention:

FIG. 3 is a chart of automatic temperature compensation.

DETAILED DESCRIPTION

Figure 1:
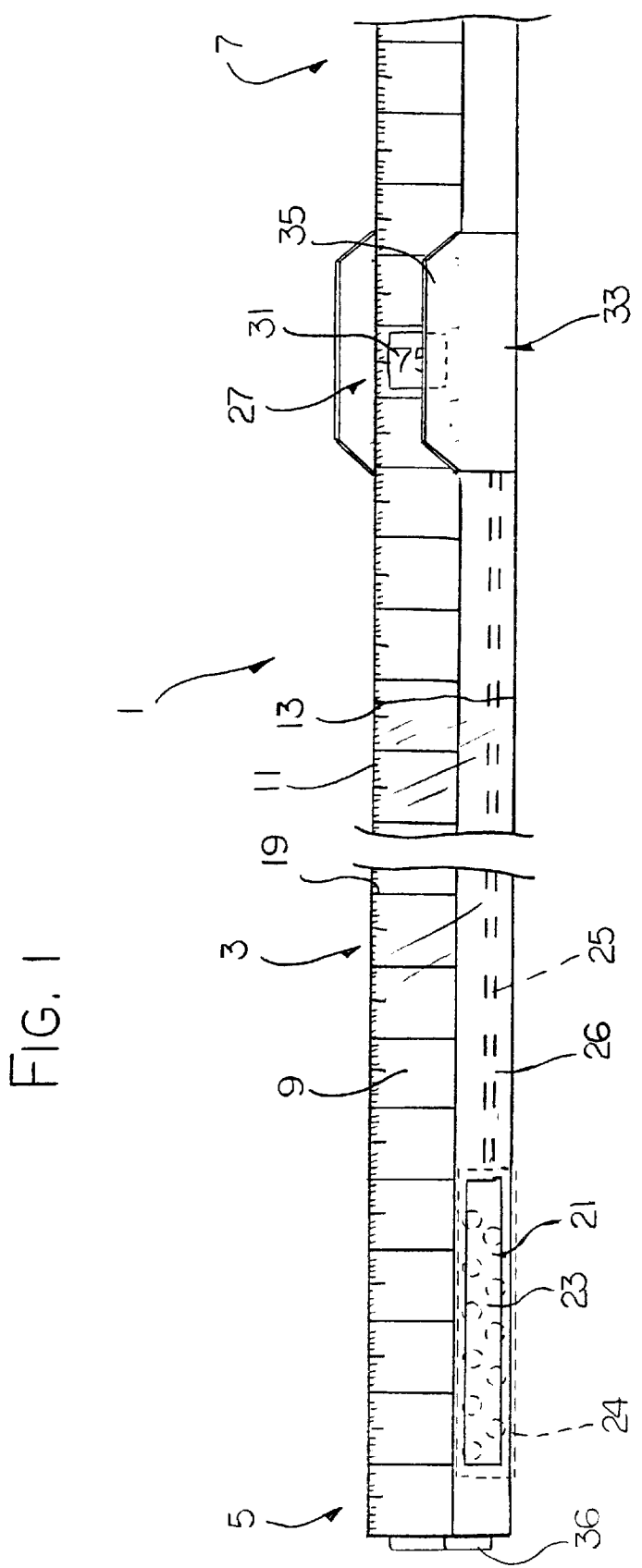
FIG. 1 is a partial isometric view of the present invention.

Referring to the accompanying drawings, there is illustrated a measuring device 1 which comprises a elongate member 3, defining a dipstick, has a first end 5 and a second end 7. The elongate member is substantially rectangular in cross section and has a side 9 which has a calibration scale 11 for measuring either metric or imperial measurements. The scale is arranged to retain a mark or imprint 13 of a liquid 15 such that the depth of the liquid, such as gasoline in a container such as a tank 17. As shown in FIG. 1, the scale has a plurality of indication lines 19 for indicating the metric or imperial measurement.

At the first end of the dipstick is a temperature sensor 21. The first end, defining a bottom end, is arranged to be inserted into the tank and to be submerged in the liquid. The temperature sensor is located on a side of the dipstick and has an exposed portion 23 which engages the liquid and thereby measures the temperature of the liquid within the tank. The sensor is covered and protected by perforated sheet material 24. A wire 25 extends along a respective side of the dipstick relative to the sensor towards the second end, defining a top end. The wire is epoxied into a slot 26 in the side of the dipstick such that the wire is not exposed to the liquid or other such elements. The wire extends to a digital thermometer 27 located substantially at the top end of the dipstick. The digital thermometer is arranged to be in the area of eye level of a user 29 such that the user can read the temperature on display 31 of the thermometer. The display is located on the side 9 of the dipstick at the indicia. An aluminium guard 33 is arranged to protect the display from damage. The aluminium guard is coupled to side walls, at respective sides of the ruled side, of the dipstick and has a pair of flanges 35 extending therefrom shielding the display. A plastic button 36 is located at the further most bottom end of the dipstick which is arranged to engage the bottom of the tank.

Figure 2:
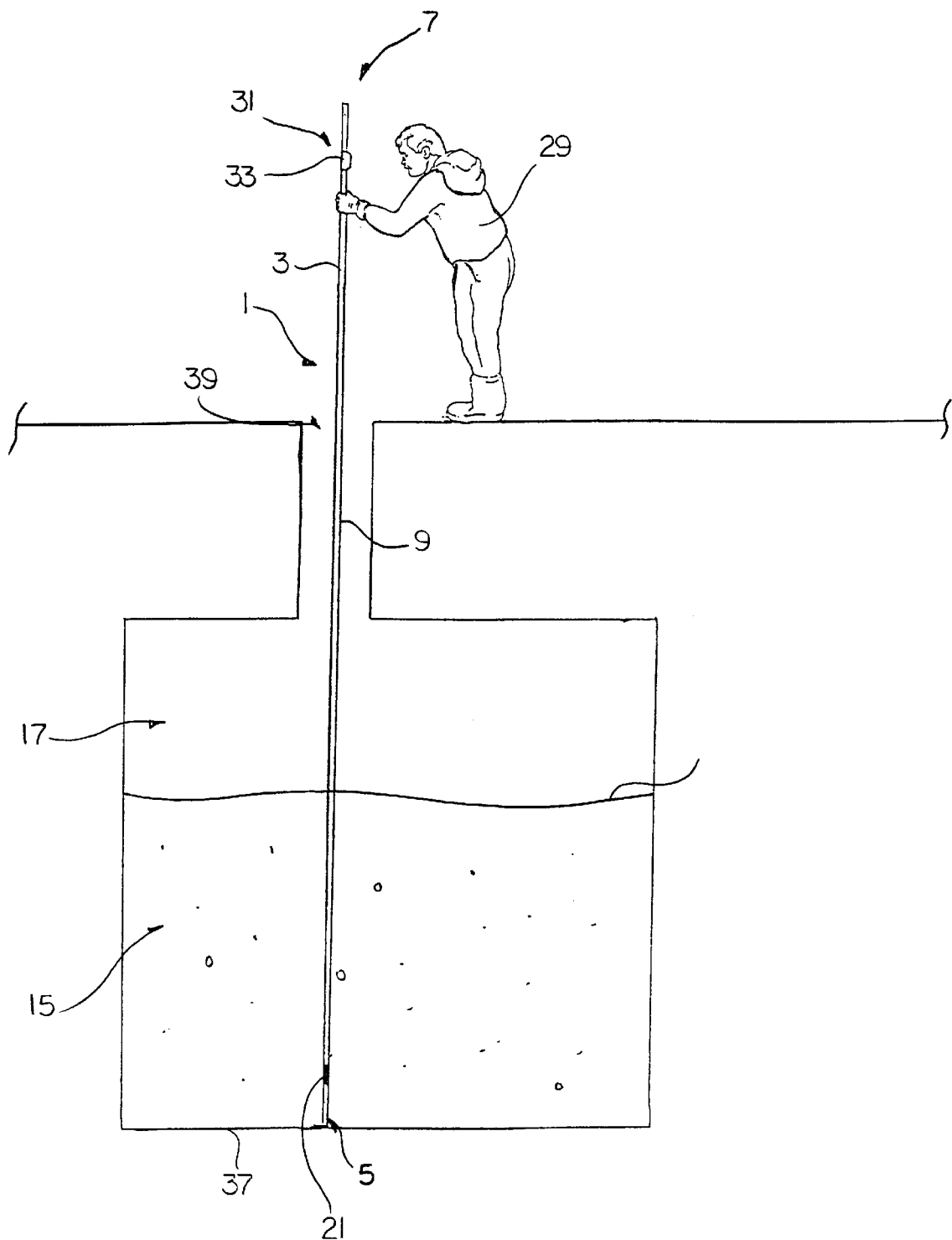
FIG. 2 is a schematic view of the present invention in use.

FIG. 2 illustrates the dipstick during operation wherein the user 29 inserts the dipstick through a hole 39 and down into the tank 17 until the bottom end of the dipstick engages a bottom surface 37 of the tank such that the dipstick is substantially vertical. The liquid level is imprinted or marked on the dipstick at the liquid surface to measure the depth. The temperature sensor is therefore located within the tank and calculates the temperature of the liquid. The user then reads the thermometer display 31 and records the temperature of the liquid. The temperature and depth of the liquid are relative since liquid expands with heat such that the user can relate the amount of liquid in relation to the temperature simultaneously. To read the depth, the user lifts the dipstick out of the tank and locates the imprint left by the liquid on the dipstick and records the depth by reading respective one of the series of indicia on the dipstick at the imprint.

FIG. 3 shows a chart with temperatures and associated compensation factors which is used to measure the temperature corrected volume of liquid in the container.

While one embodiment of the present invention has been described in the foregoing, it is to be understood that other embodiments are possible within the scope of the invention. The invention is to be considered limited solely by the scope of the appended claims.

What is claimed is:

1. A method of measuring an amount of a liquid compensated for temperature of the liquid comprising;

inserting an elongate member within a container of the liquid such that a bottom end of the elongate member engages a bottom surface of the container;

providing a temperature sensor on the elongate member such that the temperature sensor is submerged in the liquid;

providing a display on the elongate member such that the display is located at a position above the liquid and is visible by an operator;

providing a series of indicia at spaced positions along the elongate member from which a measured amount of the liquid in the container can be determined;

reading the displayed temperature of the liquid on the display which displays the temperature sensed by the temperature sensor;

removing the elongate member from the container;

locating an imprint from the liquid;

reading the level of liquid in the container on the series of indicia on the elongate member;

providing a table having a series of temperatures recorded in conjunction with a series of compensation factors associated with respective temperatures;

and using the table in association with the measured amount of the liquid from the series of indicia and the displayed temperature to determine a temperature compensated amount of the liquid in the container.

2. The method according to claim 1 wherein the temperature sensor is located at a bottom end of the elongate member.

3. The method according to claim 1 wherein the temperature display is located at a top end of the elongate member.

4. The method according to claim 1 wherein a slot is cut into a side of the elongate member arranged to receive a wire which runs along the length of the dipstick and wherein a sealant encloses the wire within the slot to protect the wire from damage.

5. The method according to claim 1 wherein a perforated sheet material is arranged to cover the sensor such that the sensor is protected from damage.

6. The method according to claim 1 wherein a shield is positioned at the display to protect the display from damage.

* * * * *